US010209730B2

(12) United States Patent
Su et al.

(10) Patent No.: US 10,209,730 B2
(45) Date of Patent: Feb. 19, 2019

(54) SERIAL BUS APPARATUS WITH CONTROLLER CIRCUIT AND RELATED USES

(71) Applicant: NXP B.V., Eindhoven (NL)

(72) Inventors: Chiahung Su, Chandler, AZ (US); Madan Mohan Reddy Vemula, Tempe, AZ (US); Abjijeet Chandrakant Kulkarni, Chandler, AZ (US); Kenneth Jaramillo, Gilbert, AZ (US); Siamak Delshadpour, Phoenix, AZ (US); Xueyang Geng, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/821,817

(22) Filed: Nov. 23, 2017

(65) Prior Publication Data
US 2018/0095490 A1  Apr. 5, 2018

Related U.S. Application Data

(63) Continuation of application No. 14/989,378, filed on Jan. 6, 2016.

(51) Int. Cl.
*H01H 35/00* (2006.01)
*H01H 83/00* (2006.01)
*H02H 3/00* (2006.01)
*H01H 47/00* (2006.01)
*G05F 3/02* (2006.01)
*H02J 4/00* (2006.01)
(Continued)

(52) U.S. Cl.
CPC ............... *G05F 3/02* (2013.01); *G06F 1/266* (2013.01); *G06F 1/3253* (2013.01); *H02J 4/00* (2013.01); *H04L 12/10* (2013.01); *H04L 43/08* (2013.01); *H04L 43/16* (2013.01); *Y04S 40/168* (2013.01)

(58) Field of Classification Search
USPC .................................................. 307/125, 130
See application file for complete search history.

(56) References Cited

U.S. PATENT DOCUMENTS

| 6,055,145 A | 4/2000 | Lagree et al. |
| 9,122,288 B1 | 9/2015 | Nayak et al. |

(Continued)

OTHER PUBLICATIONS

Universal Serial Bus Power Delivery Specification, Revision 2.0, Version 1.1, May 7, 2015.

(Continued)

*Primary Examiner* — Adam Houston (57) ABSTRACT

Low power solutions can be provided in a serial bus system with a logic controller circuit. The logic controller circuit can include analog circuitry that includes a plurality of analog components and trimming circuitry for configuring the analog components. Digital circuitry can be configured to switch between an active mode and a hibernation mode, wherein the hibernation mode consumes less current than the active mode. A voltage regulator circuit can be configured to generate a regulated voltage from a supply voltage. A reset generation circuit can be configured to determine that the supply voltage has reached a first threshold voltage level and enable the voltage regulator circuit. When the regulated voltage has reached a second threshold voltage level and the supply voltage has reached a third threshold voltage level, the digital circuitry can be switched to the active mode.

18 Claims, 7 Drawing Sheets

(51) Int. Cl.
*G06F 1/26* (2006.01)
*H04L 12/10* (2006.01)
*H04L 12/26* (2006.01)

(56) References Cited

U.S. PATENT DOCUMENTS

| | | |
|---|---|---|
| 2005/0001600 A1 | 1/2005 | Morales |
| 2009/0180145 A1 | 7/2009 | Kakizaki |
| 2010/0199246 A1 | 8/2010 | Huynh et al. |
| 2011/0074360 A1 | 3/2011 | Kerr et al. |
| 2011/0254521 A1 | 10/2011 | Iacob et al. |
| 2013/0031373 A1 | 1/2013 | Shang |
| 2013/0328890 A1 | 12/2013 | Avkarogullari et al. |
| 2014/0375127 A1 | 12/2014 | Shih et al. |
| 2015/0340898 A1 | 11/2015 | Schwartz et al. |
| 2017/0093154 A1 | 3/2017 | Geng et al. |
| 2017/0118700 A1 | 4/2017 | Lee et al. |
| 2017/0139467 A1 | 5/2017 | Waters et al. |
| 2017/0192446 A1 | 7/2017 | Su et al. |

OTHER PUBLICATIONS

Universal Serial Bus Type-C Cable and Connector Specification, Revision 1.1, Apr. 3, 2015.

FIG. 6

SERIAL BUS APPARATUS WITH CONTROLLER CIRCUIT AND RELATED USES

CROSS-REFERENCE TO RELATED APPLICATIONS

This application claims the priority under 35 U.S.C. § 119 of U.S. application Ser. No. 14/989,378, filed Jan. 6, 2016 the contents of which are incorporated by reference herein.

OVERVIEW

Aspects of various embodiments are directed to solutions in a serial bus system, and more particular aspects relate to low power solutions with trimmable components.

Bus interface protocols can be used to allow communication between a variety of different electronic devices and systems. The protocols can define the connectors in terms of their physical sizes, dimensions, and electrical connection characteristics. The protocols can also define how communications are carried out between connected devices. In some instances, the protocols define how devices negotiate with one another for purposes such as establishing communication speeds and power delivery options.

A particular type of bus interface protocol is the Universal Serial Bus (USB). While USB can be used to attach external peripherals to a Personal Computer, it can also be used for interfacings between peripherals, charging thereof and a host of other applications and uses, such as automotive, cameras, smart phones, televisions, and set-top boxes. USB can also be used as a source of power in various mobile device charging solutions. USB provides various different data transfer speeds. The USB Power Delivery (PD) protocol supports a power negotiation and delivery solution that supports up to 100 W (20V×5 A).

SUMMARY

Various embodiments of the present disclosure are directed toward an apparatus for providing low power solutions in a serial bus system. The apparatus can include a logic controller circuit that is configured to provide control over power delivery over the serial bus system. The logic controller circuit can include analog circuitry that includes a plurality of analog components and trimming circuitry for configuring the analog components. Digital circuitry of the logic controller circuit can be configured to switch between an active mode and a hibernation mode, wherein the hibernation mode consumes less current than the active mode. A voltage regulator circuit of the logic controller circuit can be configured to generate a regulated voltage from a supply voltage. The logic controller circuit can also include a reset generation circuit that is configured to determine that the supply voltage has reached a first threshold voltage level; enable, in response to determining that the supply voltage has reached the first threshold voltage, the voltage regulator circuit; determine that the regulated voltage has reached a second threshold voltage level; determine that the supply voltage has reached a third threshold voltage level; and switch, in response to determining that the regulated voltage has reached the second threshold voltage level and that the supply voltage has reached the third threshold voltage level, the digital circuitry from the hibernation mode to the active mode.

Various embodiments of the present disclosure are directed toward a method for use with a low power logic controller circuit with trimmable analog components and that is configured to provide control over power delivery over a serial bus. The method can include determining that a supply voltage has reached a first threshold voltage level; enabling, in response to determining that the supply voltage has reached the first threshold voltage, a voltage regulator circuit that is configured to generate a regulated voltage from the supply voltage; determining that the regulated voltage has reached a second threshold voltage level; determining that the supply voltage has reached a third threshold voltage level; and switching, in response to determining that the regulated voltage has reached the second threshold voltage level and that the supply voltage has reached the third threshold voltage level, a digital circuitry from a hibernation mode to an active mode, wherein the hibernation mode consumes less current than the active mode.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving a controller circuit designed for use with a serial bus. In certain implementations, aspects of the present disclosure have been shown to be beneficial when used in the context of low power solutions with high accuracy. In some embodiments, the controller circuit can be constrained relative to cost and physical space, among other constraints. These and other aspects can be implemented to address challenges, including those discussed in the background above. While not necessarily so limited, various aspects may be appreciated through a discussion of examples using such exemplary contexts.

According to various embodiments, a controller circuit includes analog circuitry that has been configured for providing accurate analog values and signals by providing a complex mix of different trimmable functional circuits. Various embodiments are directed toward multiple trimmable functional circuits that are designed for use with an external test fixture that provides accurate reference points for the different functions. In certain embodiments of the present disclosure, one or more of the different functional circuits can be configured for low power consumption while providing high accuracy due in part to trimmable capabilities of the circuit(s).

Particular embodiments are directed toward a circuit that is designed for use with USB Type-C connectors. The USB protocol for type-C connectors specifies how different devices in a system negotiate (among other things) power providing capabilities. This can include the use of a Configuration Channel (CC), with corresponding connection wires and pins. For example, a CC controller circuit can be configured to detect and communicate signals using CC pins in order to detect port attachment and detachment events and to determine power providing capabilities, cable orientation, device roles, and port control for current mode. For ease of discussion, embodiments and features are sometimes discussed with particular reference to USB and to type-C connectors. It is understood that various embodiments and features discussed herein can be used with a variety of additional and different protocols and applications, as well as to future versions of USB protocols and type-C connectors.

Certain embodiments are directed toward an apparatus for providing reduced power solutions in a serial bus system. The apparatus includes a controller circuit that is configured to provide control over power delivery within the serial bus system. In various implementations, the logic controller circuit can include analog circuitry with a plurality of analog components. Trimming circuitry can be configured to allow for the fine tuning of values and settings for various analog components. In particular implementations, the trimming circuitry can be configured for use during manufacturing and testing of the device as part of a calibration process. For example, external reference voltages and resistive values can be provided by a test fixture. These voltages and values can be used by the trimming circuitry to compensate for process, voltage and temperature (PVT) variation effects.

Consistent with various embodiments, the controller circuit can include digital circuitry that provides a number of different control and detection functions related to the serial bus. In certain instances, the digital circuit can be configured to switch between an active mode and a hibernation mode. The hibernation mode can involve the placement of various components into a suspended state so that less current (and power) is consumed than in the active mode.

According to various embodiments, a reset generator circuit can be configured to control the hibernation and active states based upon status of various power supplies and an enable signal. For instance, the controller circuit can include a voltage regulator circuit that is configured to generate a regulated voltage from a supply voltage. The reset generation/control circuit can be configured to determine when the supply voltage has reached a first threshold voltage level. In response to this determination, the reset generation circuit can enable the voltage regulator circuit. The reset generation circuit can also be configured to determine when the regulated voltage has reached a second threshold voltage level and when the supply voltage has reached a third threshold voltage level. In response to these two determinations, the reset generation circuit can switch the digital circuitry from the hibernation mode to the active mode.

Various embodiments of the present disclosure relate to a recognition that the USB Type-C CC control logic detection circuitry can benefit from an accurate voltage, current, resistor and clock frequency, which together support the ability to detect different events, such as attached or detached events.

Figure 1A:
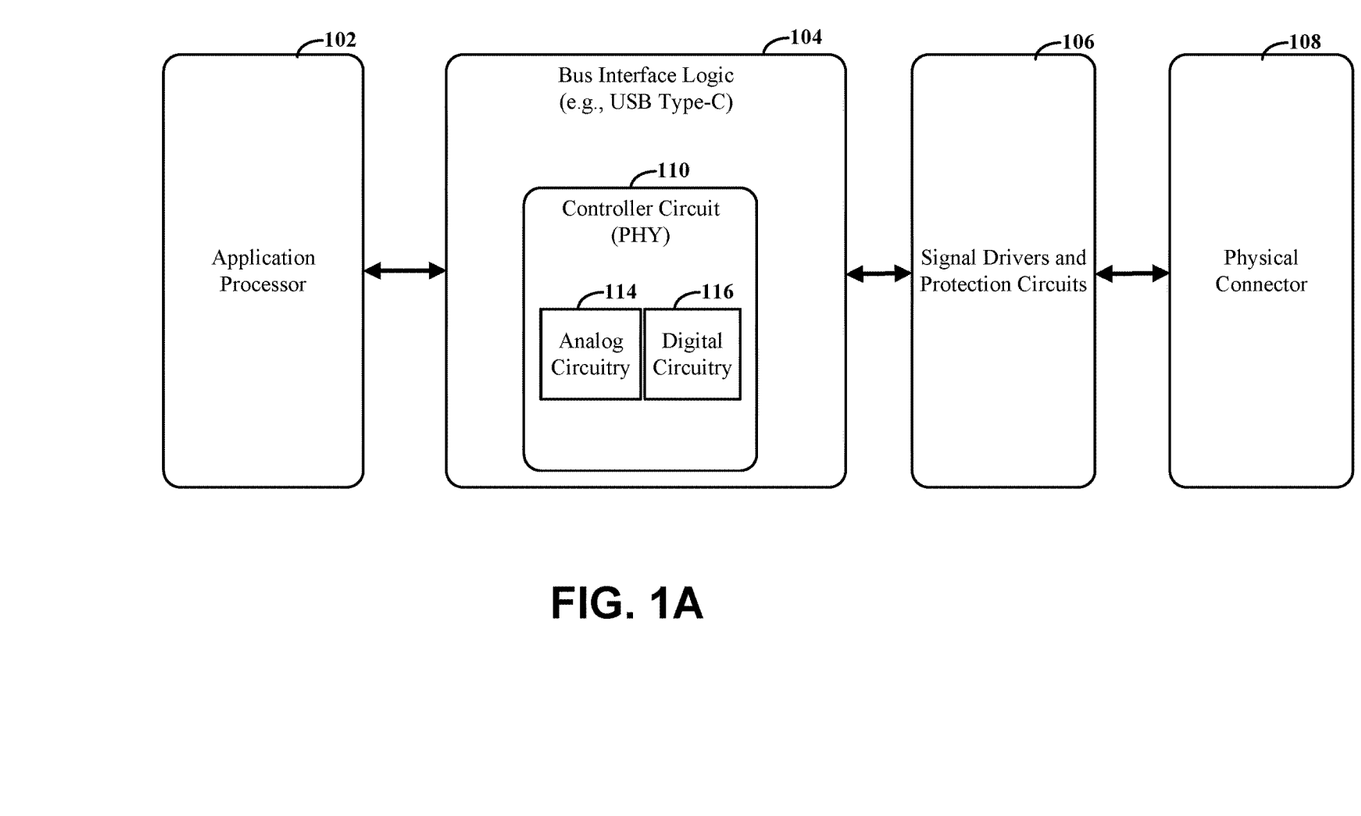
FIG. 1A depicts a block diagram for a system that is designed to use a serial bus interface to provide communication and power between devices, consistent with embodiments of the present disclosure.

Turning now to the figures, FIG. 1A depicts a block diagram for a system that is designed to use a serial bus interface to provide communication and power between devices, consistent with embodiments of the present disclosure. The system includes an application processor 102, a bus interface logic 104, signal driver circuit 106, and physical connectors 108. Application processor 102 can include one or more computer processor circuits that are configured to provide and control aspects of the system that can include the operating system, applications running on the operating system, input and output (e.g. audio and video), and other functions. Application processor designs can include multiple central processing units, memory interfaces, and graphic engines and can be configured to support various interfaces to other devices.

Bus interface logic 104 can be configured to carry out various functions defined in the relevant protocol. For example, various USB protocols specify that a compliant device should be capable of detecting the presence of other devices when they are connected to the physical connector 108. USB functions can also include, but are not limited to, detecting the orientation of an attached cable, negotiating which device will provide power, and determining power providing capabilities of a connected device. Signal drivers and protection circuits 106 can include driver circuits that produce signals that are compliant with the particular protocol. Protection circuitry can provide protection from, as but a few examples, short circuit conditions between connections, over voltage conditions, and over current conditions.

Controller circuit 110 can be configured to manage power delivery functions at the physical (PHY) layer of the Open Systems Interconnection model (OSI model). In certain embodiments, the controller circuit 110 can be implemented as part of a single integrated circuit (IC) chip. For example, the controller circuit 110 can be an IC chip that functions as a USB Type-C Configuration channel interface and USB PD Physical and Protocol layer functions. The controller circuit 110 can be useful for a wide range of applications and platforms. Non-limiting examples of applications include notebook computers, desktop computers, tablets, smart phones and accessories. In some of the applications, power consumption can be of particular importance, such as applications involving various mobile devices. Various embodiments are directed toward low power consumption of the IC chip, both during low power modes and active modes.

According to various embodiments, the controller circuit 110 can include analog circuitry 114, which can include a plurality of analog components and trimming circuitry for configuring the analog components. The controller circuit 110 can also include digital circuitry 116 that is configured to switch between an active mode and a hibernation mode, wherein the hibernation mode consumes less power and current than the active mode. In some implementations, the digital circuitry can be designed using CMOS technology, which can include MOS transistors that exhibit particularly low power conditions when they are not being actively switched.

Consistent with various embodiments of the present disclosure, the trimming circuitry can be configured to use external pins to provide accurate reference points for trimming of the various analog components. For example, the trimming circuitry can be configured to use high-precision resistors, accurate voltage sources, accurate current sources, and combinations thereof. These accurate external reference points can then be used to adjust (or trim) the values for the analog components, which can help compensate for PVT variations.

Figure 1B:
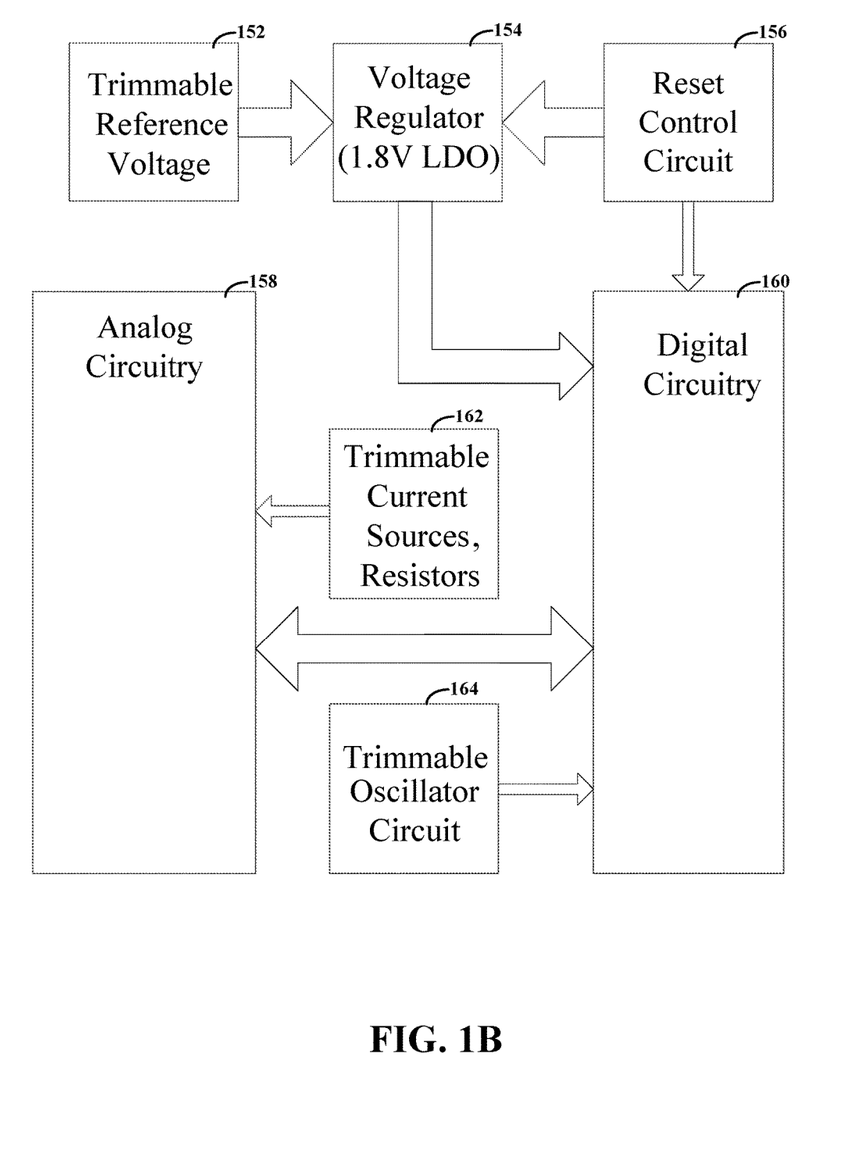
FIG. 1B shows a block diagram for a controller circuit, consistent with embodiments of the present disclosure.

FIG. 1B shows a block diagram for a controller circuit, consistent with embodiments of the present disclosure. The controller circuit depicted in FIG. 1B can be used, for example, in the system depicted in FIG. 1A. The controller circuit shown in FIG. 1B can be used in systems with various different configurations. According to some embodiments, the reset generation/control circuit 156 can be configured to control the enabling, disabling, and power saving modes for various other circuits and components. This can include enabling each of the voltage regulator circuit 154, digital circuitry 160 and analog circuitry 158. In various embodiments, the reset control circuit 156 can be configured to detect when different voltage levels meet a particular threshold and use this information to control the enablement of the various circuits. This can include monitoring a supply voltage used by the voltage regulator circuit 154 as well as monitoring the regulated voltage output by the voltage regulator circuit 154. In various embodiments, the voltage regulator circuit 154 can also be responsive to input control signals. For example, a hibernation signal can be used to determine whether the digital circuitry 160 is placed into an enabled/active mode or disabled/hibernation mode.

According to some embodiments of the present disclosure, a trimmable voltage reference circuit 152 can be configured to provide an accurate reference voltage. Various circuits, such as the voltage regulator circuit 154 and circuits that generate on-chip biasing currents, can use the reference voltage and benefit from improved accuracy thereof. As discussed herein, the trimmable voltage reference circuit 152 can be configured to allow for adjustment (trimming) of the reference voltage value during calibration of the controller circuit. This trimming can be particularly useful for compensating for process, voltage, and temperature (PVT) variations between different devices. For instance, various implementations have sufficient resolution in the trimmable settings to allow for the total voltage variations between devices to be less than 2% over expected PVT for the devices.

The trimmable current sources and resistors 162 can be configured to provide accurate current and resistive values that can be used, for example, to generate output currents and resistances that comply with the serial bus protocol being used (e.g., according to the USB Type-C specification) . For example, the current and resistor variations from USB Type-C spec is less than 8% and 10% over PVT, respectively. As discussed herein, the trimmable voltage reference circuit 152 can be configured to allow for adjustment (trimming) of the reference voltage value during calibration of the controller circuit. With sufficient resolution of trimmable settings in combination with accurate external references, the variations for the current and resistor values can be maintained within the USB Type-C specification over expected PVT.

In a similar manner, the trimmable oscillator circuit 164 can be configured to generate a clock signal that has both low power consumption and low frequency variation over the expected PVT (due in part to trimming of the frequency). For example, the trimmable oscillator circuit 164 can be configured to generate a 45 Khz clock that is used by the digital circuitry 160. In certain embodiments, the frequency variation of this clock can be controlled to within about 5% over expected PVT variations.

Figure 2:
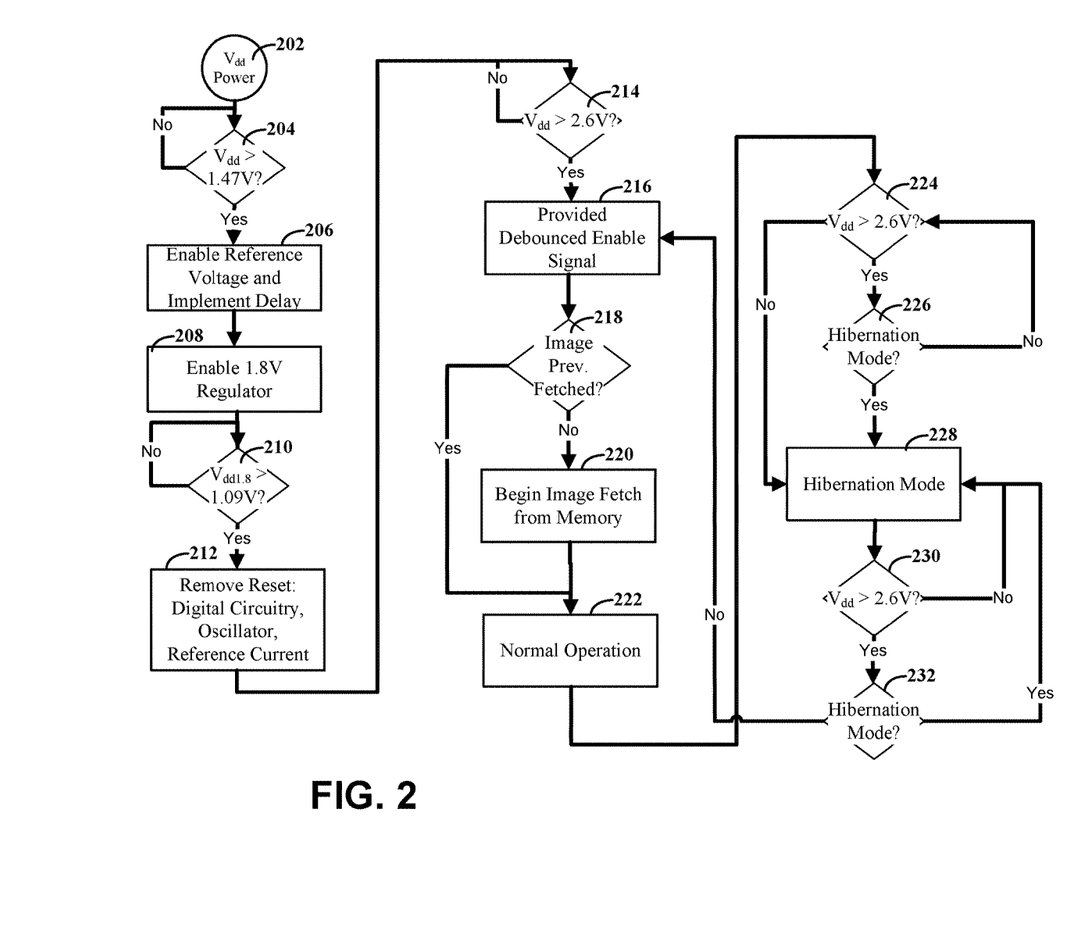
FIG. 2 depicts a state diagram for the behavior of a reset control circuit, consistent with embodiments of the present disclosure.

FIG. 2 depicts a state diagram for the behavior of a reset control circuit, consistent with embodiments of the present disclosure. The state diagram of FIG. 2 is consistent with a USB Type-C implementation; however, aspects depicted in the flow diagram can be applied to other protocols and corresponding implementations. According to various embodiments, the reset controller can be configured to operate with a wide range of supply voltages ($V_{dd}$). For instance, the reset control circuit can be designed to operate with a supply voltage that is between 2.7V and 5.5V. Moreover, the supply voltage can be provided by a source that is external to the controller circuit chip. The particular parameters of the supply voltage during ramp-up period would depend upon the external device. Ramp up characteristics, such as rate of voltage ramp-up and consistency of the ramp-up profile, may vary considerably depending upon the attached device. Accordingly, various embodiments are directed toward a reset controller that is configured to provide a successful power up for a wide range of ramp up rates of supply voltages and to account for a non-monotonic supply voltage ramp up, or other variations.

The first state in the diagram begins when a Vdd powerup event occurs, per block 202. This event represents the presence of a Vdd supply voltage. The reset control circuit then determines whether or not the supply voltage has reached a first threshold voltage, per block 204. In response to the supply voltage reaching the first threshold voltage, analog components can be enabled, per block 206. In some embodiments, the enabled analog components include a reference voltage generator circuit that can generate a reference voltage that is used by a voltage regulator. An optional delay can be implemented to allow time for the reference voltage to stabilize. The particular value of this first threshold voltage can vary depending on the particular implementation. The depicted first voltage is 1.47 volts, which represents a voltage at which the voltage regulator circuit can safely be enabled (block 208), for a particular implementation of a USB Type C compliant device. Similarly, the depicted 1.8V is provided as an example and is not necessarily limiting.

Once the voltage regulator has been enabled, the reset control circuit can determine when the regulated output voltage ($V_{dd1.8}$) reaches a second threshold voltage level, per block 210. For example, if the voltage regulator is designed to provide 1.8V at steady state, the second threshold voltage could be set to around 1.09V. During this time, the reset control circuit can be configured so that circuits that rely upon the regulated voltage are held in a reset state. Once the second threshold voltage level is reached, the reset control circuit can remove the reset for the components, per block 212. These circuits can include, but are not necessarily limited to, digital circuitry, oscillator(s), and reference current generators. According to various embodiments, the removal of the reset state can allow the digital circuitry to enter an initial state where some elements have power but the entire circuitry is not yet be fully enabled. In various embodiments, the digital circuitry is in a hibernation state when the reset is removed, but an enable signal has not yet been provided. In the hibernation state, the power consumption of the digital components can be kept very low (e.g., by limiting switching of CMOS transistors).

The reset control circuit can also be configured to determine when the supply voltage reaches a third threshold level, per block 214. The depicted value is 2.6V, which corresponds to an acceptable tolerance relative to the above example in which the power supply voltage is expected to be between 2.7V and 5.5V. Once this voltage is exceeded, the reset control circuit can generate an enable signal for the digital circuitry, per block 216. According to certain embodiments, the reset control circuit can debounce this signal (e.g., for 12 ms) to avoid oscillating between enabled and disabled states. An example of another solution for this concern is the use of a hysteresis for the enable versus disable voltage thresholds.

In certain embodiments, the reset control circuit can use analog comparator(s) to determine when the different voltages reach the corresponding threshold. This can include the use of a reference voltage to derive the threshold voltage, such as the (bandgap) reference voltage that is enabled in block 206.

Consistent with certain embodiments, the controller circuit can include a processor circuit that is initialized from a set of instructions (image) stored in a memory circuit (or just a "memory"). In some embodiments, the reset control circuit can arrive at the state corresponding to block 216 after the image has already been retrieved (e.g., by entering and leaving hibernation mode). Accordingly, the reset control circuit can be configured to determine whether or not the image was previously fetched, per block 218. For example, the image fetch procedure can include a step in which a flag is set once the image retrieval has completed. The reset control circuit can check the value of this flag before proceeding to retrieve the image from memory, per block 220. In either event, the controller circuit can then enter normal operation, per block 222.

If the reset control circuit detects that either the supply voltage has dropped below the third threshold voltage level, per block 224, or a hibernation mode signal has been received, per block 226, the reset control circuit can remove the enable signal so that the digital circuitry enters the hibernation mode, per block 228. The reset control circuit can keep the digital circuitry in the hibernation state until it detects that the supply voltage is above the third threshold and the hibernation mode signal is not present, per blocks 230 and 232, respectively.

Figure 3:
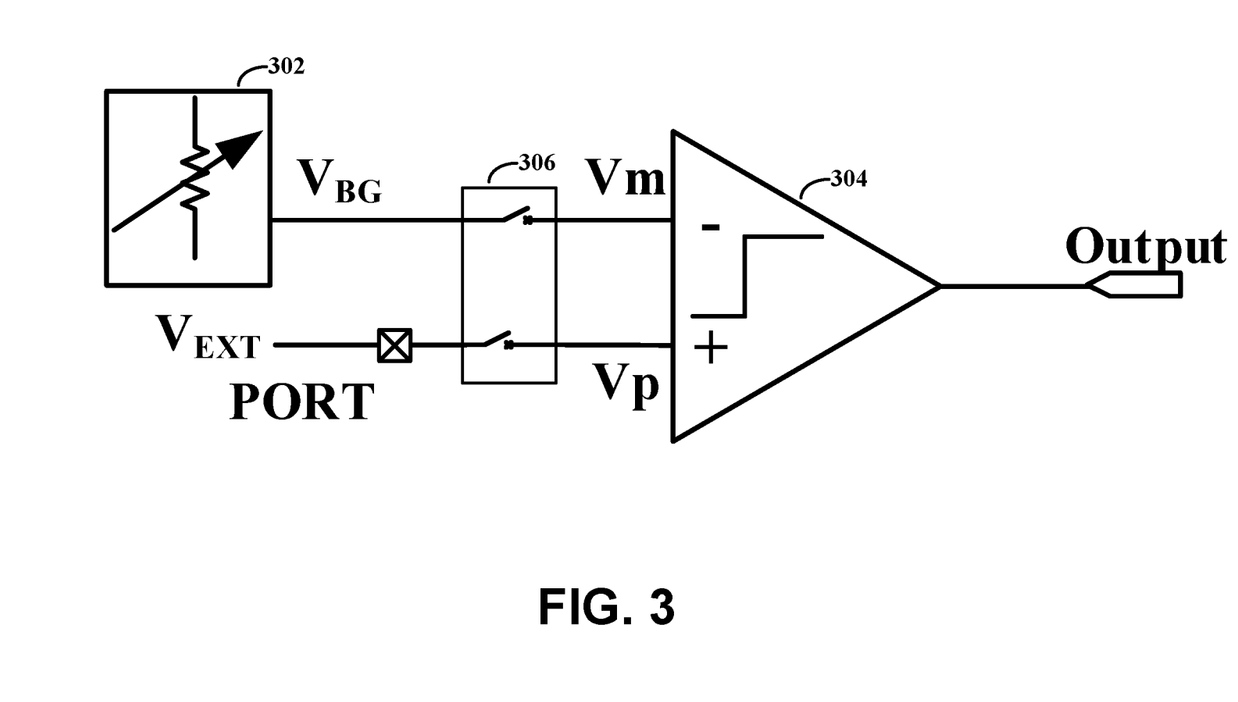
FIG. 3 depicts a circuit diagram for a trimmable reference voltage circuit, consistent with embodiments of the present disclosure.

FIG. 3 depicts a circuit diagram for a trimmable reference voltage circuit, consistent with embodiments of the present disclosure. Reference voltage circuit 302 can be configured to generate a reference voltage ($V_{BG}$) that is adjustable (trimmable) over a set of values. In certain embodiments, the reference voltage circuit 302 can be a bandgap reference circuit. During calibration of the trimmable reference voltage circuit, an external voltage ($V_{EXT}$) can be provided from automated test equipment. The automated test equipment does not have the size or cost constraints of the trimmable reference voltage circuit. Accordingly, it is possible to create a highly accurate reference voltage.

Comparator 304 can be configured to compare the reference voltage to the externally provided voltage and to produce an output (INTB) that is based upon the result of the comparison. The resulting output can be used as part of a search algorithm and the testing process can be repeated for a different trim setting for the reference voltage circuit 302. According to various embodiments, the crossover point from negative to positive values for the output can be used to identify the desired setting for the trimmable reference voltage circuit. Switches 306 can be used to connect and disconnect the comparator from the reference voltage and the external pin once the trimming process is completed.

It is recognized that comparator offset can lead to inaccurate measurement results from the comparator. In certain implementations, a low-offset comparator can be used. In some instances, the external reference voltage can be adjusted to compensate for an offset of the comparator.

Experimental testing shows that the reference voltage can be trimmed to less than 1% variations with a reference voltage that varies from 1.229V~1.238V (Temp=−40 C~105 C, Voltage=2.7/3.3/5.5V).

Figure 4:
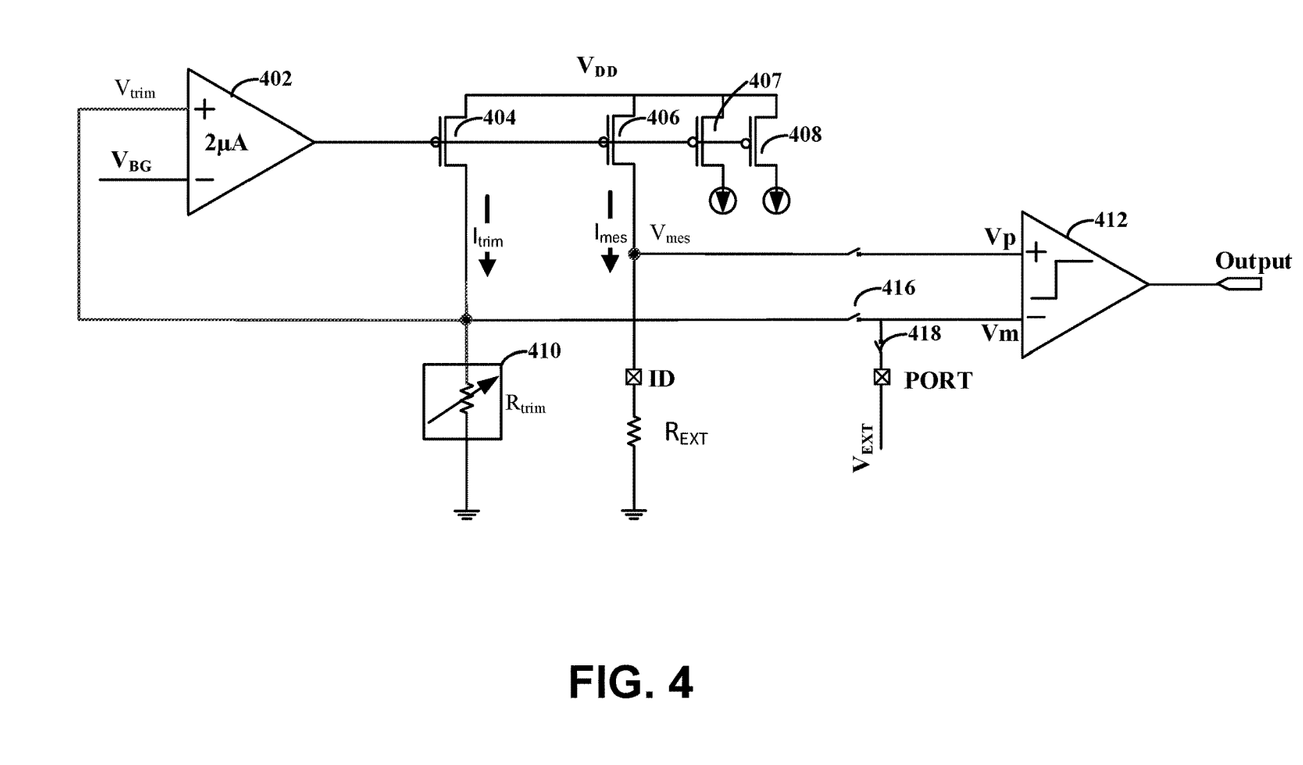
FIG. 4 depicts a circuit diagram for a trimmable current source circuit, consistent with embodiments of the present disclosure.

FIG. 4 depicts a circuit diagram for a trimmable current source circuit, consistent with embodiments of the present disclosure. Operational amplifier 402 is connected in a negative feedback configuration in order to maintain the current through transistor 404 at a desired current level. The current through transistor 404 is provided to a trimmable resistor 410 and the resulting voltage ($V_{trim}$ is provided to the positive input terminal of the amplifier 402 to create the negative feedback. A reference voltage ($V_{BG}$) is provided to the negative input terminal of the amplifier 402. The resulting output of the amplifier 402 causes the current provided by transistor 404 to increase or decrease until the voltages on the inputs of amplifier 402 are the same $V_{trim.}=V_{BG}$. The current at this point represents the steady state current level for the circuit. Because the voltage on the positive input terminal is a function of both the current ($I_{trim}$) through the transistor and the resistance ($R_{trim}$) of the trimmable resistor 410 ($V_{trim}=I_{trim}R_{trim}$), adjustments to the value of the trimmable resistor change the steady state current, i.e., changes to $R_{trim}$ result in changes to $I_{trim}$ because $I_{trim}R_{trim}=V_{BG}$.

Transistors 406-408 are configured as current mirrors to transistor 404 and thereby changes in the current through transistor 404 result in corresponding changes in the current through transistors 406-408. The internal reference current used by the controller circuit is produced by transistors 407 and 408. Transistor 406 operates to provide a measurement current ($I_{mes}$) that is the same as, or a known proportion of, the internal reference current. Consistent with embodiments of the present disclosure, the trimmable current source circuit includes a connection point (ID) that is designed for connection to automated test equipment that provides an external resistance ($R_{EXT}$). The measurement current from transistor 406 creates a voltage ($V_{mes}$) due to a corresponding voltage drop across the external resistance ($R_{EXT}$). Accordingly, the voltage on the node (Vp) is representative of the current through transistor 406. The Vp node is also connected to the positive input terminal of comparator 412 in order to compare the voltage produced by the actual current with the expected voltage.

According to certain embodiments, the measurement from comparator 412 is taken with switch 416 closed and switch 418 open. Thus, the output used for the measurement will be based upon a comparison of $V_{mes}$ with $V_{trim}$ (where $V_{trim}$ is equal to $V_{BG}$). The measurements can be repeated for different values of $R_{trim}$ and the output of comparator 412 can be stored to find the crossover point (e.g., where Vm>Vp transitions to Vp<Vm or vice versa). This information can then be used to select and set the appropriate value for $R_{trim}$.

Various embodiments are based upon the recognition that using $V_{trim}$ as the voltage used by the comparator 412 can introduce error into the output. For instance, there can be offset in the amplifier 402 and the value of the reference voltage VBG can have some error. Accordingly, the trimmable current source circuit can include a connection point (PORT) that is designed for connection to automated test equipment in order to provide an external reference voltage ($V_{EXT}$). During the measurement process, switch 418 can be closed and switch 416 can be open. Thus, the voltage on the negative terminal ($V_m$) can be has an accuracy set by the automated test equipment and not by internal process variations of the IC chip being tested.

According to embodiments, a comparator 412 can be designed to have low offset characteristics to improve the accuracy of the measurements. The measurements can be carried out using a digital binary search algorithm, although other search algorithms are also possible. Experimental results support that a current source can be trimmed to variations between 1% and 2% for Temp=−40 C~105 C, Voltage=2.7/3.3/5.5V.

Figure 5:
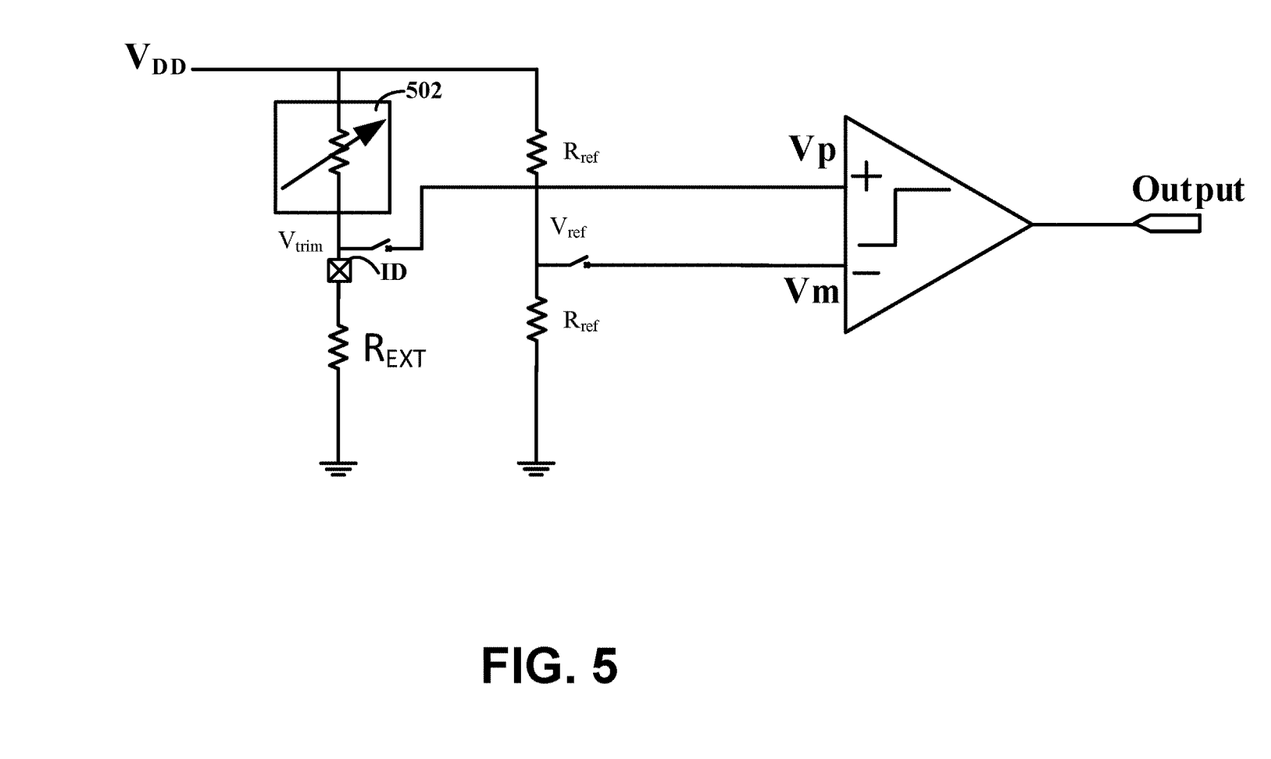
FIG. 5 shows a circuit diagram for a trimmable resistor circuit, consistent with embodiments of the present disclosure.

FIG. 5 shows a circuit diagram for a trimmable resistor circuit, consistent with embodiments of the present disclosure. The trimmable resistor circuit depicted in FIG. 5 is configured to set the resistive value for the trimmable resistor 502. The trimmable resistor circuit is configured to allow automated test equipment to connect to a connection point (ID). The trimmable resistor circuit is configured to trim the resistance of the trimmable resistor 502 so that it matches an external resistance ($R_{EXT}$) provided by the automated test equipment. This is accomplished by comparing the trimming voltage ($V_{trim}$) to a reference voltage ($V_{ref}$). As discussed in connection with other trimmable circuits, a (binary) search algorithm can be used to find the desired setting and resistive value for the trimmable resistor 502.

The reference voltage ($V_{ref}$) can be generated using a resistor divider circuit that uses two reference resistors ($R_{ref}$). Consistent with various embodiments, the resistors can be matched in terms of their ideal resistance, structure, and manufacturing process. In this manner, the PVT variations for the resistors will be closely matched and cancel one another out to provide Vref at very close to one half of $V_{DD}$. The external resistance ($R_{EXT}$) can then be set to the desired value of the trimmable resistor. The result is that $V_{trim}$ will match $V_{ref}$ when the trimmable resistor is at the desired value. For example, $R_{EXT}$ could be implemented using an external 5.1 KΩ resistor with a very high accuracy. The resistance of the trimmable resistor ($V_{trim}$) can be trimmed to 5.1 KΩ±2% after completion of the (binary) search algorithm.

Figure 6:
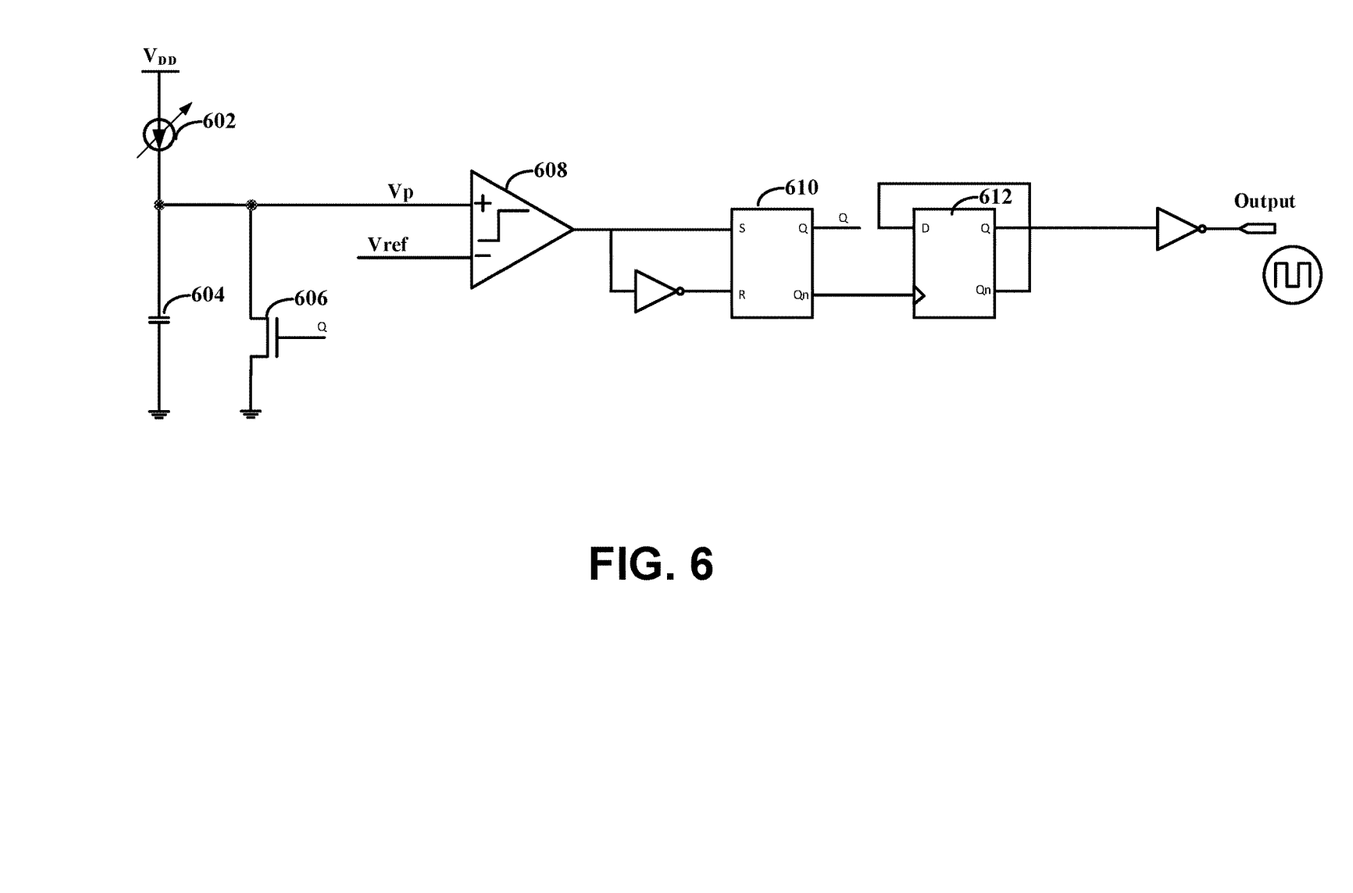
FIG. 6 shows a circuit diagram for a trimmable oscillator circuit, consistent with embodiments of the present disclosure.

FIG. 6 shows a circuit diagram for a trimmable oscillator circuit, consistent with embodiments of the present disclosure. The trimmable oscillator circuit depicted in FIG. 6 uses capacitive charging to determine the frequency of oscillation. A trimmable current source 602 is configured to be used to control the charge rate and corresponding frequency of oscillation. For example, the frequency of oscillation can be calculated as:

$$T_{on} = C/I * V_{ref} + 2 * t_{comp\_delay}$$

$$f = 1/2 \times T_{on}$$

Where Ton is the time between transitions, C is the capacitance of capacitor 604, I is the current provided by the trimmable current source 602, $V_{ref}$ is a reference voltage and $t_{comp\_delay}$ is the delay introduced by comparator 608, SR (set reset) latch 610, and any discharge time for capacitor 604.

The circuit operates by charging capacitor 604 using the trimmable current source and comparing the resulting voltage ($V_p$) to the reference voltage ($V_{ref}$). Once the reference voltage has been exceeded by the charge on the capacitor, the output of the comparator 608 inverts causing latch 610 to enable transistor 606, which then discharges the capacitor 604. In response to the discharge, latch 610 is then reset. The resetting of latch 610 results in a positive edge on the inverted output (Qn) of latch 610. The positive edge is provided to the clocking input of the flip flop 612, which is configured to invert its output on each such edge.

According to certain embodiments, the trimmable current source 602 can be a separate current source or it can be obtained from biasing circuitry, such as the trimmable circuitry discussed in connection with FIG. 4. In some instances, the reference voltage ($V_{ref}$) can be obtained through a trimmable reference, such as the trimmable circuitry discussed in connection with FIG. 3. Embodiments also allow for the capacitor 604 to be a trimmable for use in adjusting the clock frequency. The trimmable capacitor can be used in place or in combination with the trimmable current source.

Various experimental results show that a trimmable oscillator can be provided that offers a clock frequency of 45 Khz with +−5% over process, voltage and temperature.

Test results support that consistent with embodiments discussed herein, an analog circuit architecture can provide high precision, multiple features and low power consumption. Particular results suggest that for a circuit with a trimmable voltage reference, an 1.8V on-chip regulator, trimmable current source(s), a trimmable oscillator and trimmable resistors, a nominal current consumption of about 4.4 uA can be achieved in a hibernation mode, and of about 13 uA in an active mode.

Various blocks, modules or other circuits may be implemented to carry out one or more of the operations and activities described herein and/or shown in the figures. In these contexts, a "block" (also sometimes "circuit", "logic circuitry", or "module") can be implemented using a circuit that carries out one or more of these or related operations/activities. In various embodiments, a hard-wired control block can be used to minimize the area for such an implementation in case limited flexibility is sufficient. Alternatively and/or in addition, in certain of the above-discussed embodiments, one or more modules are discreet logic circuits or programmable logic circuits configured and arranged for implementing these operations/activities.

Based upon the above discussion and illustrations, those skilled in the art will readily recognize that various modifications and changes may be made to the various embodiments without strictly following the exemplary embodiments and applications illustrated and described herein. For example, an apparatus can include different trimmable components and configurations than illustrated by the Figures. Such modifications do not depart from the true spirit and scope of various aspects of the invention, including aspects set forth in the claims.

What is claimed is:

1. An apparatus for providing low power solutions in a serial bus system, the apparatus comprising:
a logic controller circuit configured to provide control over power delivery over the serial bus system, the logic controller circuit including:
analog circuitry that includes a plurality of analog components and trimming circuitry for configuring the analog components;

digital circuitry that is configured to switch between an active mode and a hibernation mode, wherein the hibernation mode consumes less current than the active mode;
a voltage regulator circuit configured to generate a regulated voltage from a supply voltage; and
a reset generation circuit configured to:
   determine that the supply voltage has reached a first threshold voltage level;
   enable, in response to determining that the supply voltage has reached the first threshold voltage, the voltage regulator circuit;
   determine that the regulated voltage has reached a second threshold voltage level;
   determine that the supply voltage has reached a third threshold voltage level; and
   switch, in response to determining that the regulated voltage has reached the second threshold voltage level and that the supply voltage has reached the third threshold voltage level, the digital circuitry from the hibernation mode to the active mode.

2. The apparatus of claim 1, wherein the plurality of analog components include at least one circuit selected from the group consisting of: a trimmable resistor circuit, a trimmable reference voltage generation circuit, a trimmable current source circuit, and a trimmable oscillator circuit.

3. The apparatus of claim 1, wherein the plurality of analog components includes a trimmable reference voltage generation circuit that includes a comparator designed to compare an internally-generated reference voltage to a voltage provided by test equipment that is external to the apparatus.

4. The apparatus of claim 1, wherein the plurality of analog components includes a trimmable resistor circuit that includes:
a resistor divider network that includes a series connection of resistors that are subject to PVT variations, wherein the series connection is configured to provide an output voltage for which effects from PVT variations that are shared between the series connection of resistors are cancelled out; and
a comparator designed to compare the output voltage with a voltage generated by a trimmable resistor and an output pin configured to be connected to an external pull down resistor.

5. The apparatus of claim 1, wherein the plurality of analog components includes a trimmable current source circuit that includes:
a first current source configured to provide varying levels of current in response to a control voltage;
a first comparator configured to generate the control voltage based upon a comparison of a reference voltage to a voltage corresponding to a setting for the trimmable current source circuit;
a second current source configured to operate as a current mirror with the first current source; and
a second comparator configured to generate an output based upon a comparison of the voltage corresponding to a setting for the trimmable current source circuit and a voltage that is proportional to current generated by the second current source.

6. The apparatus of claim 1, wherein the plurality of analog components includes a trimmable oscillator circuit that includes:
a trimmable current source configured to generate a variable current that is based upon a control signal;
a capacitive element configured to be charged by the variable current;
a discharge element configured to discharge the capacitive element in response to a discharge signal;
a comparator configured to generate an oscillation signal in response to a comparison of a voltage on the capacitive element and a reference voltage; and
a latch circuit configured to generate the discharge signal and an output signal in response to the oscillation signal.

7. The apparatus of claim 6, wherein the capacitive element is trimmable.

8. The apparatus of claim 1, wherein the trimming circuitry is configured to use a binary search algorithm to select a value for the analog components.

9. The apparatus of claim 1, wherein the logic controller circuit has a nominal current consumption of about 4.4 uA in the hibernation mode and of about 13 uA in the active mode.

10. A method for use with a low power logic controller circuit with trimmable analog components and that is configured to provide control over power delivery over a serial bus, the method comprising:
determining that a supply voltage has reached a first threshold voltage level;
enabling, in response to determining that the supply voltage has reached the first threshold voltage, a voltage regulator circuit that is configured to generate a regulated voltage from the supply voltage;
determining that the regulated voltage has reached a second threshold voltage level;
determining that the supply voltage has reached a third threshold voltage level; and
switching, in response to determining that the regulated voltage has reached the second threshold voltage level and that the supply voltage has reached the third threshold voltage level, digital circuitry from a hibernation mode to an active mode, wherein the hibernation mode consumes less current than the active mode.

11. The method of claim 10, further comprising trimming the trimmable analog components, and wherein the trimmable components include at least one circuit selected from the group consisting of: a trimmable resistor circuit, a trimmable reference voltage generation circuit, a trimmable current source circuit, and a trimmable oscillator circuit.

12. The method of claim 10, further comprising trimming the trimmable analog components, and wherein the trimmable analog components include a trimmable reference voltage generation circuit that includes a comparator designed to compare an internally-generated reference voltage to a voltage provide from test equipment external to the power logic controller circuit.

13. The method of claim 10, further comprising trimming the trimmable analog components, and wherein the trimmable analog components include a trimmable resistor circuit that includes:
a resistor divider network that includes a series connection of resistors that are subject to PVT variations, wherein the series connection of resistors provides an output voltage for which effects from PVT variations that are shared between the series connection of resistors are cancelled out;
a comparator designed to compare the output voltage with a voltage generated by a trimmable resistor and an output pin configured to be connected to an external pull down resistor.

14. The method of claim 10, further comprising trimming the trimmable analog components, and wherein the trimmable analog components include a trimmable current source circuit that includes:
- a first current source configured to provide varying levels of current in response to a control voltage;
- a first comparator configured to generate the control voltage based upon a comparison of a reference voltage to a voltage corresponding to a setting for the trimmable current source circuit;
- a second current source configured to operate as a current mirror with the first current source; and
- a second comparator configured to generate an output based upon a comparison of the voltage corresponding to a setting for the trimmable current source circuit and a voltage that is proportional to current generated by the second current source.

15. The method of claim 10, further comprising trimming the trimmable analog components, and wherein the trimmable analog components include a trimmable oscillator circuit that includes:
- a trimmable current source configured to generate a variable current that is based upon a control signal;
- a capacitive element configured to be charged by the variable current;
- a discharge element configured to discharge the capacitive element in response to a discharge signal;
- a comparator configured to generate an oscillation signal in response to a comparison of a voltage on the capacitive element and a reference voltage; and
- a latch circuit configured to generate the discharge signal and an output signal in response to the oscillation signal.

16. The method of claim 10, further comprising retrieving, in response to determining that the regulated voltage has reached the second threshold voltage level and that the supply voltage has reached the third threshold voltage level, an image from a memory circuit.

17. The method of claim 10, wherein switching the digital circuitry from the hibernation mode to the active mode includes providing an enable signal that is debounced.

18. The method of claim 17, further comprising switching, in response to determining that the supply voltage is below the third threshold voltage level, the digital circuitry from active mode to hibernation mode by removing the enable signal.

* * * * *